W. D. & W. L. HALLMAN.
DIRIGIBLE LAMP FOR AUTOMOBILES.
APPLICATION FILED APR. 13, 1912.
1,052,720.
Patented Feb. 11, 1913.
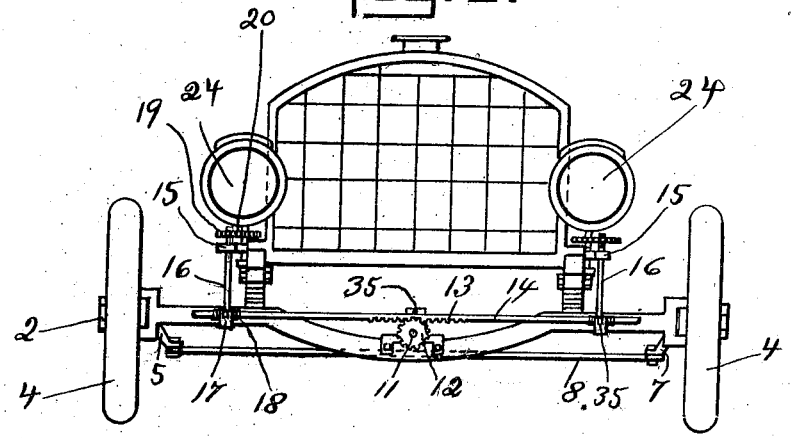
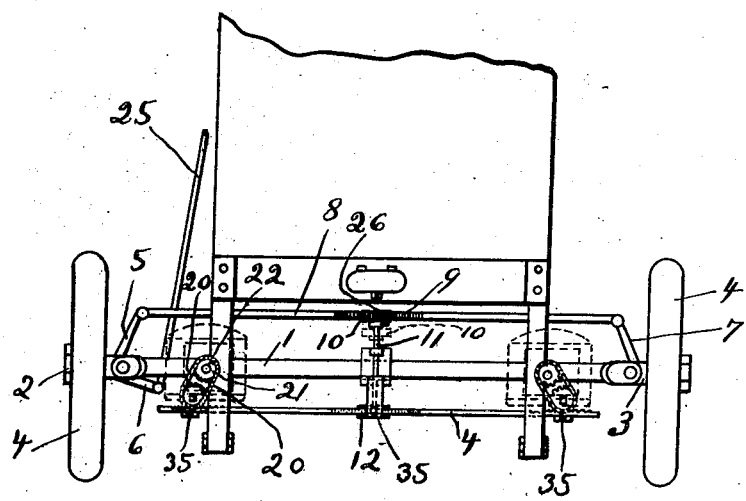

UNITED STATES PATENT OFFICE.

WALLACE D. HALLMAN AND WALLACE L. HALLMAN, OF COLLEGEVILLE, PENNSYLVANIA.

DIRIGIBLE LAMP FOR AUTOMOBILES.

1,052,720.  Specification of Letters Patent.  Patented Feb. 11, 1913.

Application filed April 13, 1912. Serial No. 690,650.

*To all whom it may concern:*

Be it known that we, WALLACE D. HALLMAN and WALLACE L. HALLMAN, citizens of the United States, residing at Collegeville, in the county of Montgomery and State of Pennsylvania, have invented certain new and useful Improvements in Dirigible Lamps for Automobiles; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in dirigible lights for automobiles and other vehicles, the object in view being to produce a mechanism whereby the rays of light from the lamps upon the vehicle may be reflected upon the path to be followed by the vehicle carrying the lamps.

Our invention is illustrated in the accompanying drawings, in which:—

Figure 1 is a front elevation showing the application of our mechanism to an automobile, and Fig. 2 is a top plan view.

Reference now being had to the details of the drawings by numerals, 1 designates the forward axle of an automobile having stub shafts 2 and 3 pivoted thereto and upon which the wheels 4 are journaled in the usual manner. The stub shaft 2 is provided with two arms 5 and 6 and the stub shaft 3 is provided with a single arm 7. A bar 8 pivotally connects the two arms 5 and 7, as shown in Fig. 2 of the drawings, and is provided with series of rack teeth 9 upon the upper edge thereof adapted to be engaged by the teeth of a gear wheel 10 which is fixed to a horizontally-disposed shaft 11 mounted in suitable bearings upon the frame of the apparatus. Said shaft 11 has a second gear wheel 12 fixed to its forward end, as shown clearly in the drawings and which is in mesh with the rack teeth 13 formed upon the under surface of the longitudinally movable bar 14.

Mounted in suitable bearing 15 upon the frame of the automobile are the vertically disposed shafts 16, each having at its lower end a pinion 17 which is in mesh with rack teeth 18 formed on the edge of the bar 14 and the upper end of each shaft carries a sprocket wheel 19 about which a sprocket chain 20 passes and which chain also passes about a sprocket wheel 21 fixed to the upper end of the shaft 22, which shaft has mounted thereon the lamp 24. In order to hold the pinions in mesh with the teeth of the rack bars opposite each pinion, an anti-friction roller 35 is mounted and adapted to bear against the edges of the bars opposite the teeth thereon.

It will be noted upon reference to the drawings that there are two of the shafts 16 similarly mounted and each adapted to simultaneously cause a lamp to be turned as the shaft 14 is moved longitudinally in one direction or the other. A steering lever 25 is fastened at one end to the arm 6 of the stub shaft 2 and affords means whereby the forward wheels of the vehicle may be shifted in the act of steering the vehicle and simultaneously with the movements of the wheels, it will be noted, that the lamps will be thrown correspondingly for the purpose of throwing the rays of light from the lamps upon the paths to be followed by the wheels of the automobile.

What we claim to be new is:—

1. A dirigible lamp for automobiles comprising, in combination with the frame and stub axles of the vehicle, arms projecting from said axles, a bar connecting said arms, and having rack teeth thereon, a horizontally-disposed, rotatable shaft, pinions fixed to said shaft, one of which is adapted to engage the teeth of said bar, a second longitudinally movable bar having teeth for engagement with the other of said pinions, a vertically-disposed rotatable shaft, a pinion fixed to each of the latter and each engaging teeth upon said second referred to bar, vertical shafts with lamps thereon, and sprocket wheel and chain connections between the shafts carrying the lamps and said vertical pinion carrying shafts, as set forth.

2. A dirigible lamp for automobiles comprising, in combination with the frame and stub axles of the vehicle, arms projecting from said axles, a bar connecting said arms and having rack teeth thereon, a horizontally-disposed, rotatable shaft, pinions fixed to said shaft, one of which is adapted to engage the teeth of said bar, a second longitudinally movable bar having teeth for engagement with the other of said pinions, a vertically disposed shaft, a pinion fixed to each of the latter and engaging teeth upon said second referred to bar, vertical shafts with lamps thereon, sprocket wheels fixed to the lamp carrying shafts, sprocket wheels upon the vertical shafts, and sprocket chain connections between the sprocket wheels, as set forth.

In testimony whereof we hereunto affix our signatures in the presence of two witnesses.

WALLACE D. HALLMAN.
WALLACE L. HALLMAN.

Witnesses:
SAMUEL SPERRY,
DAVID B. ANDERSON.

Copies of this patent may be obtained for five cents each, by addressing the "Commissioner of Patents, Washington, D. C."